March 3, 1964 J. C. KOONZ ETAL 3,122,853
FISHING LURE
Filed Aug. 10, 1961
Fig. 1.
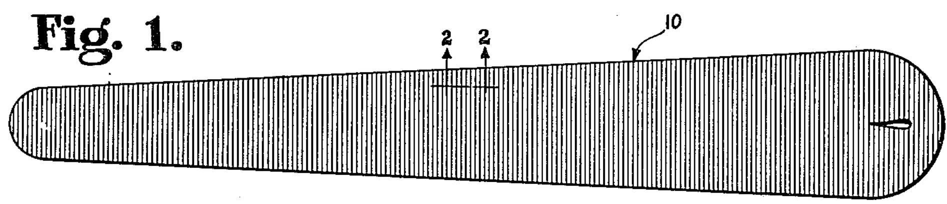
Fig. 2.
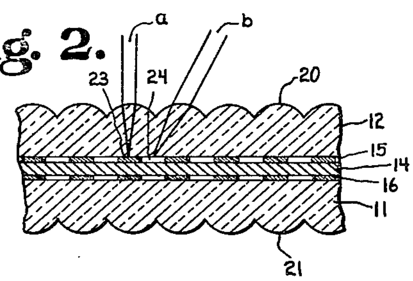
Fig. 3.
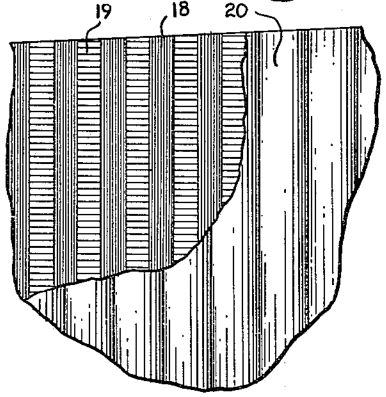
Fig. 4.
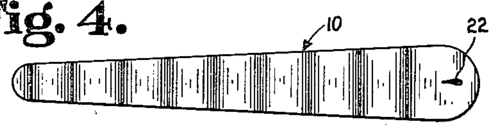
Fig. 5.
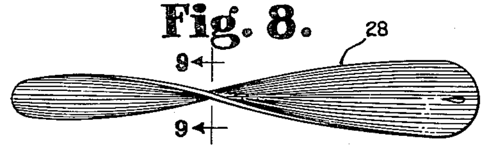
Fig. 8.
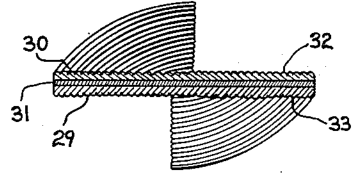
Fig. 6.
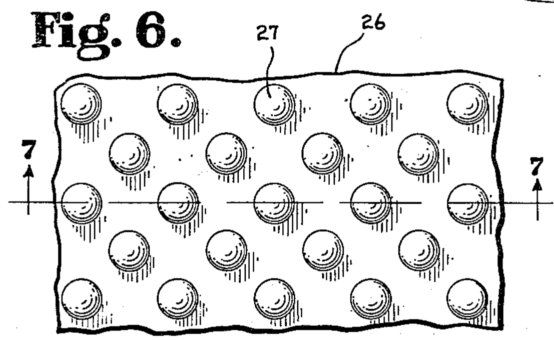
Fig. 9.
Fig. 7.
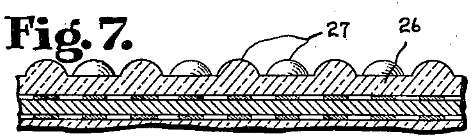
INVENTOR.
JOHN C. KOONZ and
BY GEORGE E. GYNN
Lockwood, Woodard, Smith & Weikart
Attorneys 3,122,853
Patented Mar. 3, 1964

3,122,853

FISHING LURE

John C. Koonz, R.R. 3, and George E. Gynn, 1823 Griswold St., both of Fort Wayne, Ind.

Filed Aug. 10, 1961, Ser. No. 130,644
12 Claims. (Cl. 43—42.24)

This invention relates generally to artificial fishing lures, and more particularly, it relates to artificial lures having fish attracting characteristics.

One of the common and quite successful types of fishing bait has been what is commonly known among fishermen as the "pork strip" type of bait. The pork strip usually comprises a thin elongated slice of pork which may be attached to a fishing hook and used in accordance with conventional casting or trolling techniques. This type of bait is quite limp or flexible whereby it can move through the water with a wavy motion which tends to attract fish.

The principal object of this invention is to provide a novel fishing lure which is similar to the pork strip type of lure in respect to size and shape and action in the water but which is of such character that its motions create apparent flashes of light or changes of color.

Another object of this invention is to provide a pork strip type of fishing lure formed of limp or flexible material having good durability characteristics.

This invention comprises a fishing lure formed of a transparent plastic strip of material, one side of which includes strips of different colors, and the other side of which is formed to provide a plurality of adjacent partially cylindrical lenses.

The full nature of the invention will be understood from the accompanying drawings and the following description and claims:

FIG. 1 is a plan view of a fishing lure incorporating this invention.

FIG. 2 is an enlarged partial cross section taken on line 2—2 of FIG. 1.

FIG. 3 is an enlarged fragmentary plan view of the lure shown in FIG. 1 with parts broken away.

FIG. 4 is a plan view on a reduced scale of the lure illustrated in FIG. 1 demonstrating the wave motion of the lure.

FIG. 5 is an edgewise view of the lure illustrated in FIG. 4.

FIG. 6 is a fragmentary plan view of another modification of this invention.

FIG. 7 is a cross section taken on line 7—7 of FIG. 6.

FIG. 8 is a plan view of still another modification of this invention.

FIG. 9 is an enlarged cross section taken on line 9—9 of FIG. 8.

Referring to the drawings, this invention comprises a pork strip type of fishing lure 10 wherein there is provided a pair of oppositely facing, relatively transparent plastic strips 11 and 12. The facing surfaces of the strips 11 and 12 may be glued or otherwise attached to a central strip 14. Between the interfaces of strips 11 and 12 there are provided layers of material 15 and 16 having alternate bands 18 and 19 of different colors. Each of the strips 11 and 12 has an outer surface formed to provide transverse partially cylindrical lens sections such, for example, as 20 and 21. It should be understood that the composite structure, consisting of strips 11, 12 and 14, is formed of such material and has dimensions such that the entire lure is quite limp and has about the same characteristics as would a strip of pork of the same length and thickness. It should also be understood that a fishing lure may also be constructed in accordance with this invention so as to comprise a single strip of material, such as strip 11, with a layer of transverse color bands, such as 16, whereby the lure comprises only a single strip of material.

In action the lure may be attached to a hook by threading the hook through the aperture 22. When the bait or lure is cast or trolled, its motion through the water will cause the lure to bend or flex so that it has one or more wavy portions as illustrated in FIGS. 4 and 5. When the lure bends or assumes a wavy motion, or when the angle of the lure with respect to a fish changes, flashes of light or color will be visible to the fish. Referring to FIG. 2 it can be seen that when light impinges on one of the cylindrical lenses 20, as indicated by the lines *a*, a transverse color strip, such as 23, will be visible to the fish. Alternatively, if the angle of view changes, as illustrated by the lines *b*, a transverse color strip or band 24 will become visible to the fish. This characteristic of the lure provides constantly changing flashes of color or light which are visible to any fish in the vicinity of the lure.

FIGS. 6 and 7 illustrate another modification of this invention wherein there is provided a lure having the same over-all configuration as illustrated in FIGURE 1, but wherein the outer transparent strips, such as 26, are formed to have individual convex lenses 27. Otherwise the construction of this modification of the invention is the same as described in connection with FIGS. 1, 2 and 3, and the motion of this type of lure will provide constantly changing colors or flashes of light in a similar manner to that previously described.

FIGS. 8 and 9 illustrate a further modification of this invention wherein the lure is formed to have a permanent twist. For example, the lure 28 has transparent outer strips 29 and 30 and an inner gluing strip 31. The outer strips 29 and 30 may be provided with longitudinal cylindrical lenses as indicated at 32 and 33 and color bands may be disposed longitudinally between members 29 and 31 and between members 30 and 31.

This type of lure will naturally assume a rotary motion as it travels through the water and rapid changes of color or rapid flashes of light will be visible to any fish in the vicinity.

While the drawings illustrate a lure having a pair of oppositely facing transparent plastic strips 11 and 12, it will be readily understood that it is within the scope of this invention to provide a lure having only one transparent plastic strip. Furthermore, it should be understood that the strips, such as 11 and 12, may be made of many different plastic materials and many other types of materials provided they have the ability to withstand repeated wetting and are transparent. It will also be understood that, while the invention is shown in a particular elongated form, lures can readily be made in many other different shapes and sizes.

The invention claimed is:

1. A fishing lure comprising a limp flexible strip of light pervious material, a plurality of individual lens elements on one surface of said strip, and a multicolor pattern on the other surface of said strip divided into color elements optically and individually associated with said lens elements in such a manner that different color elements are visible through a given lens element from different angles of view, whereby when said lure is retrieved through the water, it has a fluttering action resulting in an animated color display.

2. A fishing lure as described in claim 1 wherein said lens elements and said color pattern are optically related in such a manner that one color at a time is visible through a given lens element.

3. A fishing lure as described in claim 1 wherein said lens elements are partially cylindrical.

4. A fishing lure as described in claim 1 wherein said lens elements are convex.

5. A fishing lure as described in claim 1 wherein said color pattern and said lens elements are so related that different colors are visible simultaneously through different lens elements.

6. A fishing lure as described in claim 1 wherein said strip is twisted.

7. A fishing lure comprising a pair of oppositely facing limp flexible strips having a plurality of individual light pervious lens elements on the outer surfaces thereof and a multicolor pattern disposed between said strips divided into color elements optically and individually associated with said lens elements in such a manner that different color elements are visible through a given lens element from different angles of view, whereby when said lure is retrieved through the wtaer, it has a fluttering action resulting in an animated color display.

8. A fishing lure as described in claim 7 wherein said lens elements are partially cylindrical.

9. A fishing lure as described in claim 7, wherein said lens elements are convex.

10. A fishing lure as described in claim 7 wherein said lens elements and said color pattern are optically related in such a manner that one color at a time is visible through a given lens element.

11. A fishing lure as described in claim 7 wherein said color pattern and said lens elements are so related that different colors are visible simultaneously through different lens elements.

12. A fishing lure comprising a limp flexible strip of light pervious material formed on one surface into a series of transverse parallel partially cylindrical lens surfaces, and a second strip of material on the other surface of said strip having parallel transverse colored sections optically related to said lenses in such a manner that different ones of said sections become visible when viewed from different angles, whereby when said lure is retrieved through the water, it has a fluttering action creating an animated color display.

References Cited in the file of this patent

UNITED STATES PATENTS

| | | |
|---|---|---|
| 1,475,430 | Curwen | Nov. 27, 1923 |
| 2,149,464 | Potts | Mar. 7, 1939 |
| 2,432,896 | Hotchner | Dec. 16, 1947 |
| 2,503,672 | Johnson et al. | Apr. 11, 1950 |
| 2,514,938 | Craig | July 11, 1950 |
| 2,617,228 | Fasano et al. | Nov. 11, 1952 |
| 2,752,721 | Denny | July 3, 1956 |
| 2,764,834 | Klein | Oct. 2, 1956 |
| 2,933,847 | Frasure | Apr. 26, 1960 |
| 2,951,308 | Kent | Sept. 6, 1960 |
| 2,951,419 | Lemelson | Sept. 6, 1960 |
| 2,996,826 | Lamar | Aug. 22, 1961 |

FOREIGN PATENTS

| | | |
|---|---|---|
| 281,100 | Great Britain | Dec. 1, 1927 |